United States Patent
Yamane et al.

(10) Patent No.: US 12,146,040 B2
(45) Date of Patent: Nov. 19, 2024

(54) WATER-REPELLENT, OIL-REPELLENT MEMBER AND METHOD FOR MANUFACTURING WATER-REPELLENT, OIL-REPELLENT MEMBER

(71) Applicant: SHIN-ETSU CHEMICAL CO., LTD., Tokyo (JP)

(72) Inventors: Yuji Yamane, Annaka (JP); Lisa Katayama, Annaka (JP); Ryusuke Sakoh, Annaka (JP); Takashi Matsuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1176 days.

(21) Appl. No.: 16/753,019

(22) PCT Filed: Sep. 11, 2018

(86) PCT No.: PCT/JP2018/033635
§ 371 (c)(1),
(2) Date: Apr. 2, 2020

(87) PCT Pub. No.: WO2019/069642
PCT Pub. Date: Apr. 11, 2019

(65) Prior Publication Data
US 2020/0254482 A1  Aug. 13, 2020

(30) Foreign Application Priority Data
Oct. 3, 2017  (JP) ................. 2017-193240

(51) Int. Cl.
| | | |
|---|---|---|
| C08J 7/04 | (2020.01) | |
| B05D 1/36 | (2006.01) | |
| B05D 5/08 | (2006.01) | |
| B05D 7/00 | (2006.01) | |
| B05D 7/24 | (2006.01) | |
| B32B 27/28 | (2006.01) | |
| B32B 33/00 | (2006.01) | |
| C08G 65/00 | (2006.01) | |
| C08G 65/336 | (2006.01) | |
| C08J 7/043 | (2020.01) | |
| C08J 7/046 | (2020.01) | |
| C09K 3/18 | (2006.01) | |

(52) U.S. Cl.
CPC .............. *C08J 7/0423* (2020.01); *B05D 1/36* (2013.01); *B05D 5/083* (2013.01); *B05D 7/24* (2013.01); *B05D 7/544* (2013.01); *B32B 27/283* (2013.01); *B32B 27/285* (2013.01); *B32B 33/00* (2013.01); *C08G 65/007* (2013.01); *C08G 65/336* (2013.01); *C08J 7/043* (2020.01); *C08J 7/046* (2020.01); *C09K 3/18* (2013.01); *C08J 2471/02* (2013.01)

(58) Field of Classification Search
None
See application file for complete search history.

(56) References Cited

U.S. PATENT DOCUMENTS

| | | |
|---|---|---|
| 6,001,485 A | 12/1999 | Kobayashi et al. |
| 2007/0149746 A1 | 6/2007 | Yamane et al. |
| 2007/0197758 A1 | 8/2007 | Yamane et al. |
| 2008/0071042 A1 | 3/2008 | Yamane et al. |
| 2008/0114120 A1 | 5/2008 | Koike et al. |
| 2008/0241523 A1 | 10/2008 | Huignard et al. |

(Continued)

FOREIGN PATENT DOCUMENTS

| | | | |
|---|---|---|---|
| EP | 842908 A1 | * | 11/1997 |
| JP | 10-194784 A | | 7/1998 |
| JP | 2007-197425 A | | 8/2007 |
| JP | 2007-523776 A | | 8/2007 |
| JP | 2007-297543 A | | 11/2007 |
| JP | 2007-297589 A | | 11/2007 |
| JP | 2008-88412 A | | 4/2008 |

(Continued)

OTHER PUBLICATIONS

International Search Report, issued in PCT/JP2018/033635, dated Nov. 20, 2018.

(Continued)

*Primary Examiner* — Marc S Zimmer
(74) *Attorney, Agent, or Firm* — Birch, Stewart, Kolasch & Birch, LLP

(57) ABSTRACT

This water-repellent, oil-repellent member is obtained via a method comprising: a step for wet-coating a substrate surface with a solution containing an organic silicon compound comprising multiple silanol groups and a solvent; a step for drying the solvent to form a primer layer; a step for wet-coating the primer layer with a solution containing a fluorine-containing compound and a solvent, followed by drying the solvent, or dry-coating with the fluorine-containing compound obtained by evaporating the solvent from the solution; and a step for curing the fluorine-containing compound to form a water-repellent, oil-repellent layer. The water-repellent, oil-repellent member is obtained by providing, on various substrates, a primer layer of a specific thickness containing, as a main component, an organic silicon compound comprising multiple silanol groups, followed by providing, on the primer layer, a water-repellent, oil-repellent layer of a specific thickness containing, as a main component, the cured fluorine-containing compound according to the above mentioned method. It is thus possible to stably and simply form a water-repellent, oil-repellent coating exhibiting superior abrasion resistance on various substrates, and the primer layer and water-repellent, oil-repellent layer can be applied using a room-temperature (25° C.) process.

7 Claims, No Drawings

(56) References Cited

U.S. PATENT DOCUMENTS

| | | | |
|---|---|---|---|
| 2010/0029889 A1 | 2/2010 | Yamane et al. | |
| 2010/0076211 A1 | 3/2010 | Yamane et al. | |
| 2011/0098402 A1 | 4/2011 | Yamane et al. | |
| 2013/0216820 A1 | 8/2013 | Riddle et al. | |
| 2014/0113145 A1 | 4/2014 | Yamane et al. | |
| 2014/0147680 A1 | 5/2014 | Yamane et al. | |
| 2014/0302332 A1 | 10/2014 | Murotani et al. | |
| 2015/0307719 A1 | 10/2015 | Mitsuhashi et al. | |
| 2015/0337430 A1 | 11/2015 | Yoshida et al. | |
| 2016/0362558 A1 | 12/2016 | Nguyen | |
| 2019/0177574 A1* | 6/2019 | Takeda | C08G 77/54 |
| 2021/0238453 A1* | 8/2021 | Yamaguchi | C08G 77/00 |
| 2021/0332248 A1* | 10/2021 | Yamane | C09D 171/00 |

FOREIGN PATENT DOCUMENTS

| | | | | |
|---|---|---|---|---|
| JP | 2008-144144 A | | 6/2008 | |
| JP | 2010-31184 A | | 2/2010 | |
| JP | 2010-47516 A | | 3/2010 | |
| JP | 2011-116947 A | | 6/2011 | |
| JP | 2011-178835 A | | 9/2011 | |
| JP | 2013-253228 A | | 12/2013 | |
| JP | 2014-503380 A | | 2/2014 | |
| JP | 2014-84405 A | | 5/2014 | |
| JP | 2014-105235 A | | 6/2014 | |
| JP | 2014-218639 A | | 11/2014 | |
| JP | 2017-25324 A | | 2/2017 | |
| JP | 2018-524157 A | | 8/2018 | |
| WO | WO 2010/038648 A1 | | 4/2010 | |
| WO | WO 2013/121984 A1 | | 8/2013 | |
| WO | WO 2014/097388 A1 | | 6/2014 | |
| WO | WO 2016/190047 A1 | | 12/2016 | |
| WO | WO 2017/022638 A1 | | 2/2017 | |
| WO | WO 2018/034138 | * | 2/2018 | |
| WO | WO-2019208141 A1 | * | 10/2019 | |
| WO | WO-2020039795 A1 | * | 2/2020 | B05D 7/546 |
| WO | WO 2019/208141 | * | 10/2021 | |

OTHER PUBLICATIONS

Written Opinion of the International Searching Authority, issued in PCT/JP2018/033635, dated Nov. 20, 2018.

* cited by examiner

WATER-REPELLENT, OIL-REPELLENT MEMBER AND METHOD FOR MANUFACTURING WATER-REPELLENT, OIL-REPELLENT MEMBER

TECHNICAL FIELD

This invention relates to a water/oil repellent member and a method for preparing the same. More particularly, it relates to a water/oil repellent member having a primer layer formed between a substrate and a water/oil repellent layer using an organosilicon compound having a plurality of silanol groups, and a method for preparing the same.

BACKGROUND ART

For the purpose of improving aesthetic appearance or visibility, the demand for the technology of rendering articles unsusceptible to staining or the technology of cleaning off stains is increasing every year. In particular, since eyeglass lenses, smartphones, wearable terminals, car navigation panels, electronic instrument housings, kitchen cabinets, and transportation vehicle bodies are susceptible to deposition of sebum and oil stains on their surface, it is desired to provide their surface with a water/oil repellent layer. However, fluorinated compounds used as the water/oil repellent agent are non-adhesive or non-bondable to various substrates because of very low surface free energy. It is thus difficult to attach the water/oil repellent agent directly to substrates.

To address the problem, as a treating agent capable of water/oil repellent treatment on surfaces of glass and other substrates, for example, Patent Document 1 (JP-A 2011-116947) discloses a fluorooxyalkylene group-containing polymer composition having the following average compositional formula:

$$A-Rf^1-B \qquad [\text{Chem. 1}]$$

wherein $Rf^1$ is a divalent linear fluorooxyalkylene group containing 5 to 100 repeating units: $-C_dF_{2d}O-$ wherein d is an integer of 1 to 6 and may be different among repeating units, A and B are each independently a group selected from $Rf^2$ and the following formula:

[Chem. 2]

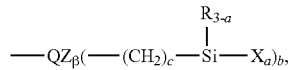

$Rf^2$ is F, H, or a monovalent fluorinated group terminated with $-CF_3$ or $-CF_2H$ group, Q is a divalent organic group, Z is a di- to heptavalent organopolysiloxane residue having a siloxane bond, R is $C_{1-4}$ alkyl or phenyl, X is a hydrolyzable group, a is 2 or 3, b is an integer of 1 to 6, c is an integer of 1 to 5, and β is an integer of 0 or 1.

Although the treating agent of Patent Document 1 exhibits relatively good durability on surfaces of substrates typically of glass where a number of silanol groups are present, it is difficult to provide good adhesion of the agent to metals, metal oxides and resins.

As the means for improving adhesion, Patent Document 2 (WO 2014/097388) discloses a method of depositing a $SiO_2$ layer as a primer layer by a dry process like evaporation or sputtering. It is described that a water/oil repellent layer having good durability is formed by this method. However, the range of application of this method is limited from the standpoints of productivity and production cost because treatment must be conducted in vacuum and a massive unit is necessary for coating large-size substrates.

On the other hand, Patent Document 3 (WO 2010/038648) discloses a polysilazane solution from which a primer layer is deposited by a wet process. After the polysilazane solution is coated, the polysilazane is converted to silica glass through reaction with moisture. Although this method is superior to the dry method in that the vacuum process is not used, there are left problems of productivity and cost because high-temperature heating or humidifying over a long term is necessary to stabilize the adhesion of a water/oil repellent layer. Another problem arises from the aspect of heat resistance that the substrates to which the method is applicable are limited.

As the prior art technology relating to the present invention, the following documents are cited as well as the above-cited documents.

PRIOR ART DOCUMENTS

Patent Documents

Patent Document 1: JP-A 2011-116947
Patent Document 2: WO 2014/097388
Patent Document 3: WO 2010/038648
Patent Document 4: JP-A 2007-197425
Patent Document 5: JP-A 2007-297589
Patent Document 6: JP-A 2007-297543
Patent Document 7: JP-A 2008-088412
Patent Document 8: JP-A 2008-144144
Patent Document 9: JP-A 2010-031184
Patent Document 10: JP-A 2010-047516
Patent Document 11: JP-A 2011-178835
Patent Document 12: JP-A 2014-084405
Patent Document 13: JP-A 2014-105235
Patent Document 14: JP-A 2013-253228
Patent Document 15: JP-A 2014-218639
Patent Document 16: WO 2013/121984

SUMMARY OF INVENTION

Technical Problem

An object of the invention, which has been made under the above-mentioned circumstances, is to provide a water/oil repellent member having improved abrasion resistance, and a method for preparing a water/oil repellent member by depositing a water/oil repellent layer having improved abrasion resistance on any one of various substrates by the wet or dry technique.

Solution to Problem

Making extensive investigations to attain the above object, the inventors have found that a water/oil repellent member in which a primer layer composed mainly of an organosilicon compound having a plurality of silanol groups and having a specific thickness is deposited on any one of various substrates, and a water/oil repellent layer composed mainly of a cured product of a fluorinated compound and having a specific thickness is then deposited on the primer layer is obtained by a method comprising the steps of wet coating a solution of an organosilicon compound having a plurality of silanol groups in a solvent onto the surface of a substrate, drying the solvent to form a primer layer, wet coating a solution of a fluorinated compound in a solvent onto the primer layer and drying the solvent, or dry coating onto the primer layer the fluorinated compound obtained by evaporating the solvent from the solution, and curing the fluorinated compound to form a water/oil repellent layer; that the water/oil repellent member can endow various substrates with a water/oil repellent film having improved abrasion resistance in a consistent simple manner; and that the primer layer and the water/oil repellent layer can be coated by the room temperature (25° C.) process. The invention is predicated on this finding.

Accordingly, the invention provides a water/oil repellent member and a method for preparing the same, as defined below.

[1]

A water/oil repellent member comprising a substrate, a primer layer deposited on at least one surface of the substrate as a first layer, and a water/oil repellent layer deposited thereon as a second layer, the primer layer being composed mainly of an organosilicon compound having a plurality of silanol groups and having a thickness of 0.5 to 500 nm, the water/oil repellent layer being composed mainly of a cured product of a fluorinated compound and having a thickness of 0.5 to 30 nm.

[2]

The water/oil repellent member of [1] wherein the organosilicon compound having a plurality of silanol groups is a hydrolytic dehydrated condensate of tetraethoxysilane.

[3]

The water/oil repellent member of [1] or [2] wherein the fluorinated compound has at least one hydrolyzable group at one or more ends, the hydrolyzable group being selected from among $C_{1-12}$ alkoxy groups, $C_{1-12}$ alkoxyalkoxy groups, $C_{1-10}$ acyloxy groups, $C_{2-10}$ alkenyloxy groups, halogen, amino, and silazane groups.

[4]

The water/oil repellent member of any one of [1] to [3] wherein the fluorinated compound is a fluorooxyalkylene group-containing organosilicon compound having in the molecule

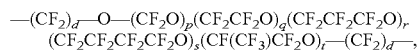

wherein p, q, r, s, and t are each independently an integer of 0 to 200, p+q+r+s+t is 3 to 500, each unit in parentheses may be randomly arranged, d is an integer of 0 to 8, the unit with d may be linear or branched, and having at least one hydrolyzable group at one or more ends.

[5]

The water/oil repellent member of any one of [1] to [4] wherein the fluorinated compound is at least one compound selected from hydrolyzable fluorinated organosilicon compounds having the general formulae (1), (2), (3), (4), and (5):

wherein Rf is

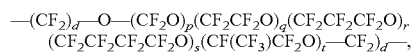

p, q, r, s, and t are each independently an integer of 0 to 200, p+q+r+s+t is 3 to 500, each unit in parentheses may be randomly arranged, d is an integer of 0 to 8, the unit with d may be linear or branched, A is fluorine, hydrogen or a monovalent fluorinated group terminated with —$CF_3$, —$CF_2H$ or —$CH_2F$ group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group, α and β are each independently an integer of 1 to 7, α+β is 2 to 8, and γ is an integer of 2 to 8,

wherein Rf and A are as defined above, Q is a single bond or divalent organic group, δ is an integer of 1 to 10, Y is a divalent organic group having a hydrolyzable group, and B is hydrogen, $C_{1-4}$ alkyl or halogen.

[6]

The water/oil repellent member of [5] wherein the hydrolyzable fluorinated organosilicon compounds having formulae (1) to (5) are the following:

[Chem. 3]

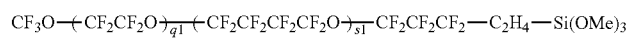

[Chem. 4]

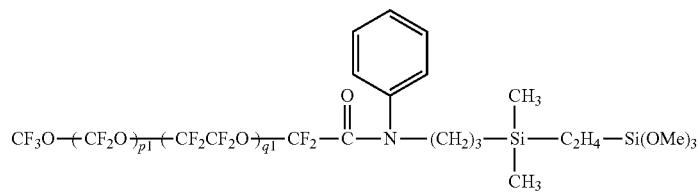

[Chem. 5]

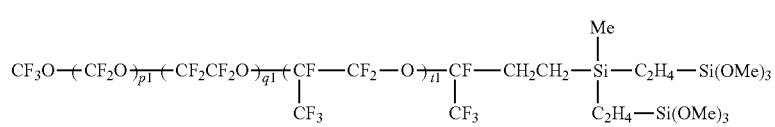

[Chem. 6]

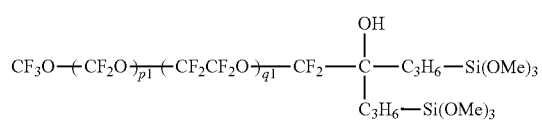

-continued
[Chem. 7]
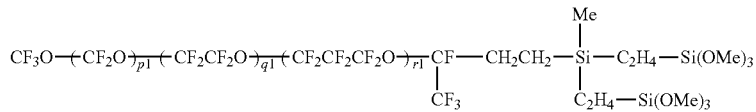
[Chem. 8]
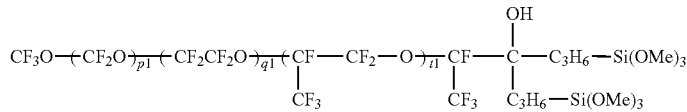
[Chem. 9]
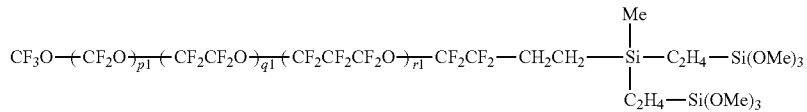
[Chem. 10]
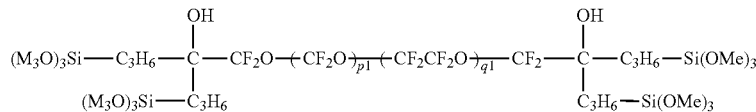
[Chem. 11]
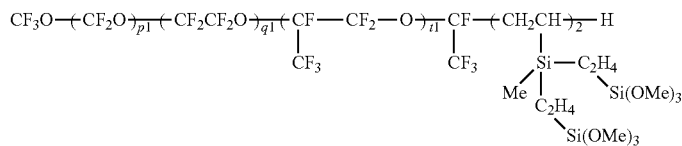
[Chem. 12]
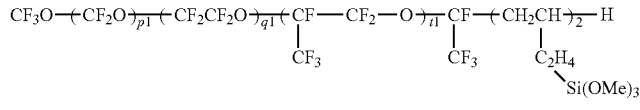
[Chem. 13]
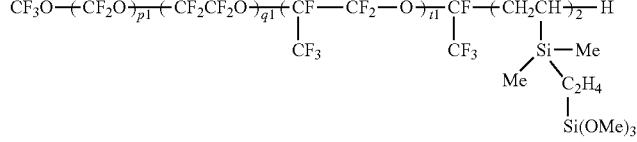
[Chem. 14]
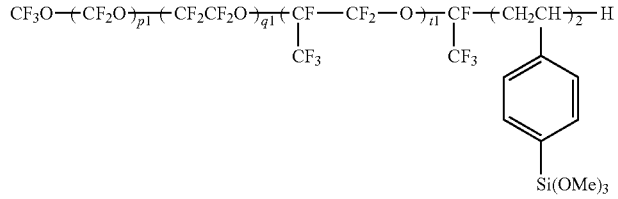
[Chem. 15]
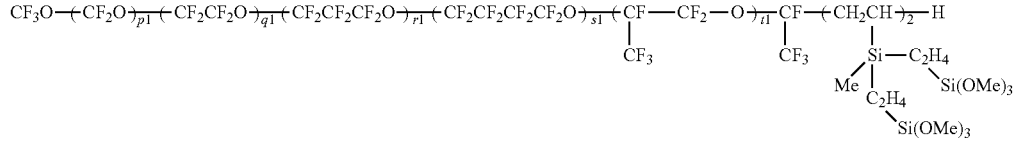
[Chem. 16]
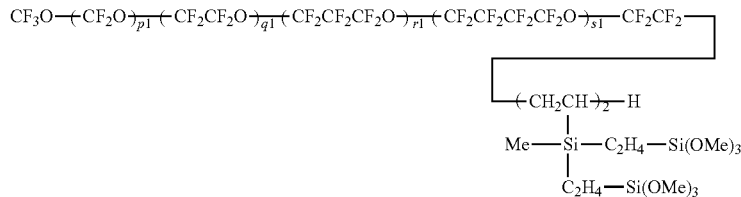

-continued
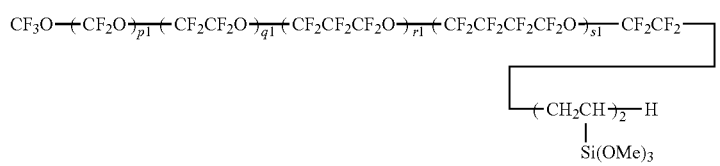
[Chem. 17]
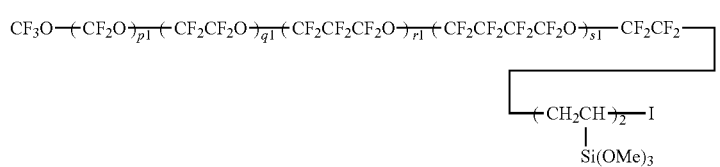
[Chem. 18]
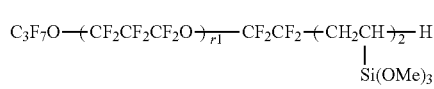
[Chem. 19]
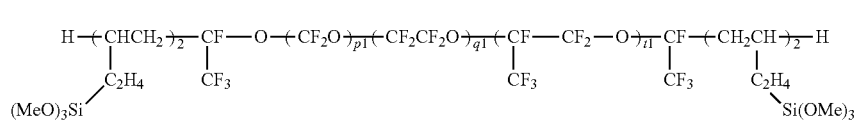
[Chem. 20]
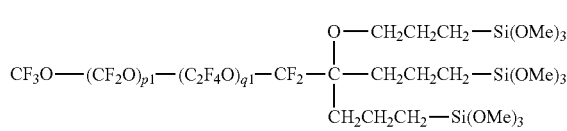
[Chem. 21]
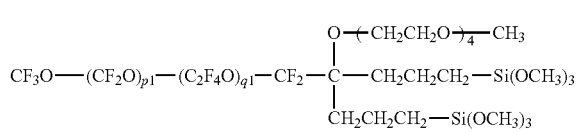
[Chem. 22]
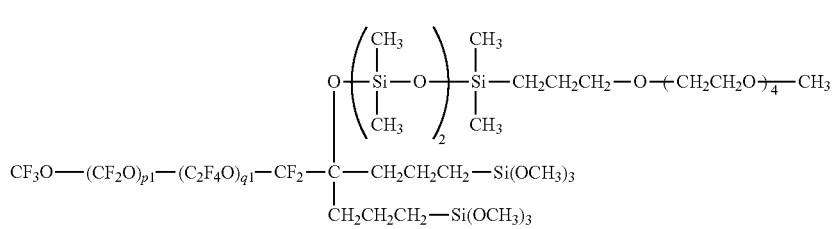
[Chem. 23]
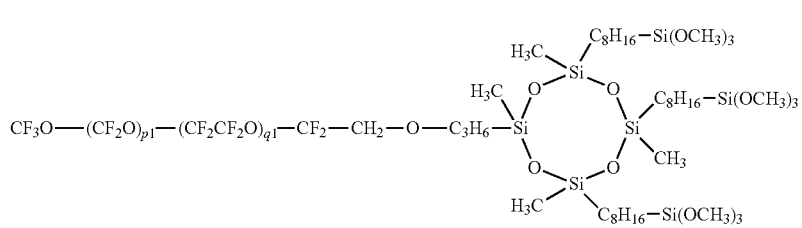
[Chem. 24]
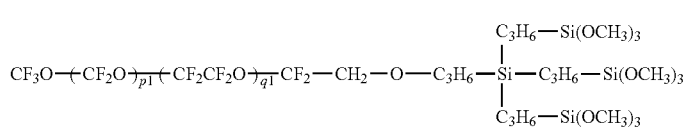
[Chem. 25]
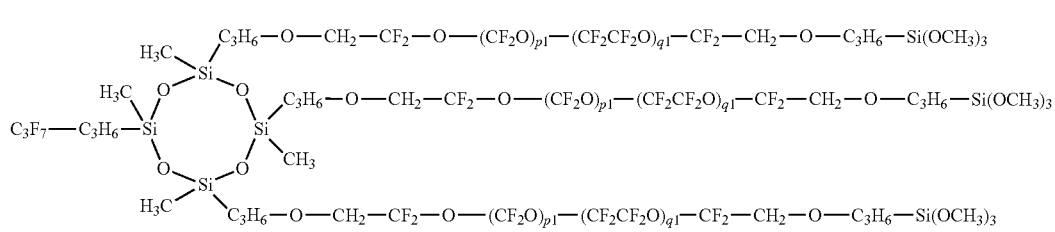
[Chem. 26]

-continued

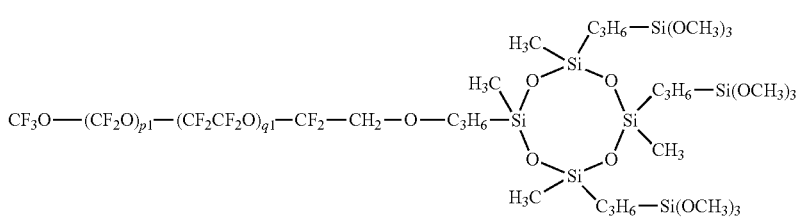
[Chem. 27]

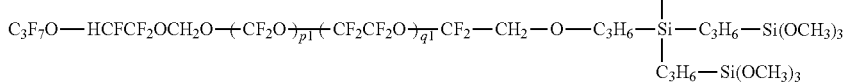
[Chem. 28]

wherein Me is methyl, p1, q1, r1, s1, and t1 are each independently an integer of 1 to 200, the sum of p1, q1, r1, s1, and t1 is 3 to 500, each unit in parentheses may be randomly arranged.

[7]

The water/oil repellent member of any one of [1] to [6] wherein the substrate is of a metal oxide, metal, resin, ceramic, quartz, glass, sapphire, or diamond.

[8]

A method for preparing the water/oil repellent member of any one of [1] to [7], the method comprising the steps of:
wet coating a solution of an organosilicon compound having a plurality of silanol groups in a solvent onto a surface of a substrate,
drying the solvent to form a primer layer,
wet coating a solution of a fluorinated compound in a solvent onto the primer layer and then drying the solvent, or providing a solution of a fluorinated compound in a solvent, evaporating off the solvent, and dry coating the fluorinated compound onto the primer layer, and
curing the fluorinated compound to form a water/oil repellent layer.

Advantageous Effects of Invention

According to the invention, there is provided a water/oil repellent member having an antifouling layer with improved water/oil repellent properties tightly adhered to its surface. The method for preparing the water/oil repellent member enables to form the relevant layer by the wet process (e.g., brush coating, spin coating, spraying, gravure coating, die coating, bar coating or slit coating) without resorting essentially to the vacuum process or high-temperature heating process. The water/oil repellent member and the method are useful in a variety of applications, for example, articles which must have an antifouling surface, typically electronic instrument housings, wearable terminals, kitchen wares, sanitary wares, transportation vehicle bodies, touch panel displays, protective films, and the like.

DESCRIPTION OF EMBODIMENTS

Now the invention is described in detail.
The invention provides a water/oil repellent member comprising a substrate, a primer layer disposed on the substrate, composed mainly of an organosilicon compound having a plurality of silanol groups, and having a thickness of 0.5 to 500 nm, and a water/oil repellent layer disposed on the primer layer, composed mainly of a cured product of a fluorinated organic compound, and having a thickness of 0.5 to 30 nm, which is prepared, for example, by a method comprising the steps of wet coating a solution of an organosilicon compound having a plurality of silanol groups in a solvent onto a surface (at least one surface) of a substrate, drying the solvent to form a primer layer, wet coating a solution of a fluorinated compound in a solvent (i.e., water/oil repellent agent) onto the primer layer and then drying the solvent, or providing a solution of a fluorinated compound in a solvent, evaporating off the solvent, and dry coating the fluorinated compound onto the primer layer, and curing the fluorinated compound to form a water/oil repellent layer.

The substrate which can be used herein is not particularly limited and is preferably selected from metal oxides, metals, resins, ceramics, quartz, glass, sapphire, and diamond.

Suitable substrate-forming metal oxides include SiO, $SiO_2$, $Al_2O_3$, ITO, $In_2O_3$, $SnO_2$, $ZrO_2$, $TiO_2$, $Ti_2O_3$, $Ti_4O_7$, $Ti_3O_5$, $Nb_2O_5$, $Ta_2O_5$, $Y_2O_3$, $WO_3$, $HfO_2$, and $La_2Ti_2O_7$.

Suitable substrate-forming metals include magnesium, magnesium alloys, titanium, titanium alloys, chromium, iron, nickel, cobalt, copper, zinc, yttrium, zirconium, niobium, molybdenum, ruthenium, rhodium, palladium, silver, tungsten, platinum, gold, stainless steel, aluminum, aluminum alloys, duralumin, and Hastelloy.

Suitable substrate-forming resins include thermoplastic resins and thermosetting resins. Specifically stated, suitable thermoplastic resins include celluloid, cellulose acetate, cellulose propionate, cellulose butyrate, aliphatic polyamides such as nylon 6, nylon 66, nylon 12, aromatic polyamides, (meth)acrylic resins, ABS resins, AS resins, polystyrene, polyolefins such as polyethylene (low density or high density) and polypropylene, polyvinyl chloride, polyvinylidene chloride, ethylene-vinyl acetate copolymers, polyvinyl alcohol, polyacetal, saturated polyesters such as polycarbonate, polyethylene terephthalate, polybutylene terephthalate, aromatic polyesters, polyether ketones, polyether ether ketones, polysulfone, polyether sulfone, polyether imide, polyarylate, polymethylpentene, ionomers, liquid crystal polymers, polyimides, polyamide imides, fluoro-resins, polyphenylene sulfide, (modified) polyphenylene oxide, and thermoplastic polyurethane. Suitable thermosetting resins include epoxy resins, unsaturated polyesters, thermosetting polyurethane, polyimide, diethylene glycol bisallyl carbonate polymers (commonly known as CR-39), (co)polymers of di(meth)acrylate of (halogenated) bisphenol A, (co)polymers of urethane-modified di(meth) acrylate of (halogenated) bisphenol A, and copolymers of diacrylate compounds or vinyl benzyl alcohol with unsaturated thiol compounds.

The primer layer disposed on the substrate is composed mainly of an organosilicon compound having a plurality of silanol groups, preferably at least 50% by weight of the organosilicon compound, and has a thickness of 0.5 to 500 nm. The primer layer may be formed by wet coating a solution of an organosilicon compound having a plurality of silanol groups in a solvent onto the surface of a substrate, and drying the solution to remove the solvent.

The organosilicon compound having a plurality of silanol groups should preferably have at least two, more preferably at least three, and even more preferably at least four silanol groups per molecule. If the number of silanol groups is less than two, the coating itself may be weak. It is noted that the organosilicon compound having a plurality of silanol groups should preferably have a silanol content of 0.0001 to 0.05 mol/g, more preferably 0.001 to 0.04 mol/g, and even more preferably 0.005 to 0.03 mol/g.

The organosilicon compound having a plurality of silanol groups may be prepared by hydrolyzing an organosilicon compound having a plurality of hydrolyzable groups.

Examples of the organosilicon compound having a plurality of hydrolyzable groups include methyltrimethoxysilane, dimethyldimethoxysilane, phenyltrimethoxysilane, dimethoxydiphenylsilane, tetraethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, 1,6-bis(trimethoxysilyl)hexane, trifluoropropyltrimethoxysilane, vinyltrimethoxysilane, vinyltriethoxysilane, 2-(3,4-epoxycyclohexyl) ethyltrimethoxysilane, 3-glycidoxypropylmethyldimethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, tris(trimethoxysilylpropyl) isocyanurate, trichlorosilane, and dichlorosilane, which may be used in admixture.

In the practice of the invention, a higher molecular weight product obtained by hydrolyzing an organosilicon compound having a plurality of hydrolyzable groups as mentioned above, and effecting dehydrating condensation is preferably used as the organosilicon compound having a plurality of silanol groups.

The hydrolytic dehydrated condensate should preferably have a weight average molecular weight (Mw) of 300 to 100,000, more preferably 5,000 to 50,000. As used herein, the weight average molecular weight (Mw) may be determined, for example, by gel permeation chromatography (GPC) using toluene as developing solvent versus polystyrene standards (the same holds true, hereinafter).

Most preferably, the organosilicon compound having a plurality of silanol groups used herein is a hydrolytic dehydrated condensate of tetraethoxysilane.

The organosilicon compound having a plurality of silanol groups is desirably diluted with a solvent. Preferred examples of the solvent for diluting the organosilicon compound having a plurality of silanol groups include alcohols such as methanol, ethanol, isopropanol and butanol, and ethers such as propylene glycol monomethyl ether and polyethylene glycol monopropyl ether, but are not limited thereto. An appropriate solvent may be selected in view of substrate wetting and boiling point. The solution of the organosilicon compound having a plurality of silanol groups in a solvent should preferably contain the organosilicon compound in a concentration of 0.01 to 10% by weight, more preferably 0.1 to 2% by weight. If the concentration is too low, more portions may be left uncoated. If the concentration is too high, secondary agglomeration can take place between silanol groups.

In the solution of the organosilicon compound having a plurality of silanol groups in a solvent, additives such as UV absorbers, light stabilizers, antioxidants, leveling agents, anti-foaming agents, pigments, dyes, dispersants, antistatic agents, anti-fogging agents, and surfactants may be used if necessary.

A primer layer composed mainly of the organosilicon compound having a plurality of silanol groups may be formed by coating the solution of the organosilicon compound having a plurality of silanol groups in a solvent onto a substrate surface by a wet coating process, specifically dipping, brush coating, spin coating, spray coating, gravure coating, die coating, bar coating, slit coating or flow coating, and then drying off the solvent. If desired, the coating may be heated at a temperature in the range which does not affect the substrate, for example, at 40 to 500° C. for 1 minute to 24 hours.

The primer layer disposed on the substrate surface typically has a thickness of 0.5 to 500 nm, preferably 3 to 200 nm, more preferably 10 to 100 nm although the thickness is selected as appropriate depending on a particular substrate. As used herein, the thickness may be measured by any well-known methods such as spectral ellipsometry and X-ray reflection method.

Next, an antifouling surface layer (or water/oil repellent layer) is formed by coating a water/oil repellent agent onto the surface of the primer layer and curing the agent. The water/oil repellent agent is based on a fluorinated organosilicon compound. Any of the fluorinated organosilicon compounds may be used which are described in JP-A 2007-197425, JP-A 2007-297589, JP-A 2007-297543, JP-A 2008-088412, JP-A 2008-144144, JP-A 2010-031184, JP-A 2010-047516, JP-A 2011-116947, JP-A 2011-178835, JP-A 2014-084405, JP-A 2014-105235, JP-A 2013-253228, JP-A 2014-218639, and WO 2013/121984 (Patent Documents 1, 4 to 16).

The fluorinated organosilicon compound (or fluorinated compound) is described below in further detail.

The fluorinated compound used herein is preferably a fluorinated compound having at least one hydrolyzable group at one or more ends. More preferably the compound is an organosilicon compound having a hydrolyzable group in the molecule and fluorine, the hydrolyzable group being typically selected from $C_{1-12}$, especially $C_{1-10}$ alkoxy groups such as methoxy, ethoxy, propoxy and butoxy, $C_{2-12}$, especially $C_{2-10}$ alkoxyalkoxy groups such as methoxymethoxy and methoxyethoxy, $C_{1-10}$ acyloxy groups such as acetoxy, $C_{2-10}$ alkenyloxy groups such as isopropenoxy, halogen groups such as chloro, bromo and iodo, amino groups, and silazane groups. The fluorinated compound is preferably a compound having a fluorooxyalkylene group. The fluorooxyalkylene group refers to a compound of (poly)fluorooxyalkylene structure having a plurality of repeating units: —$C_jF_{2j}O$— bonded wherein j is an integer of at least 1, preferably 1 to 6, more preferably 1 to 4. Especially, the structure may have 3 to 500, preferably 15 to 200, more preferably 20 to 100, even more preferably 25 to 80 repeating units.

The repeating units: —$C_jF_{2j}O$— may be linear or branched. Examples include the following units while repeating units of more than one type may be bonded.

—CF$_2$O—
—CF$_2$CF$_2$O—
—CF$_2$CF$_2$CF$_2$O—
—CF(CF$_3$)CF$_2$O—
—CF$_2$CF$_2$CF$_2$CF$_2$O—
—CF$_2$CF$_2$CF$_2$CF$_2$CF$_2$O—
—C(CF$_3$)$_2$O—

Most preferably, the (poly)fluorooxyalkylene structure is —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, wherein p, q, r, s, and t are each independently an integer of 0 to 200, preferably p is an integer of 5 to 100, q is an integer of 5 to 100, r is an integer of 0 to 100, s is an integer of 0 to 50, t is an integer of 0 to 100, and p+q+r+s+t is an integer of 3 to 500, preferably an integer of 10 to 105. Each unit in parentheses may be randomly arranged. The subscript d is independently an integer of 0 to 8, preferably an integer of 0 to 5, more preferably an integer of 0 to 2, and the unit with d may be linear or branched. Specific examples are shown by the following structures.

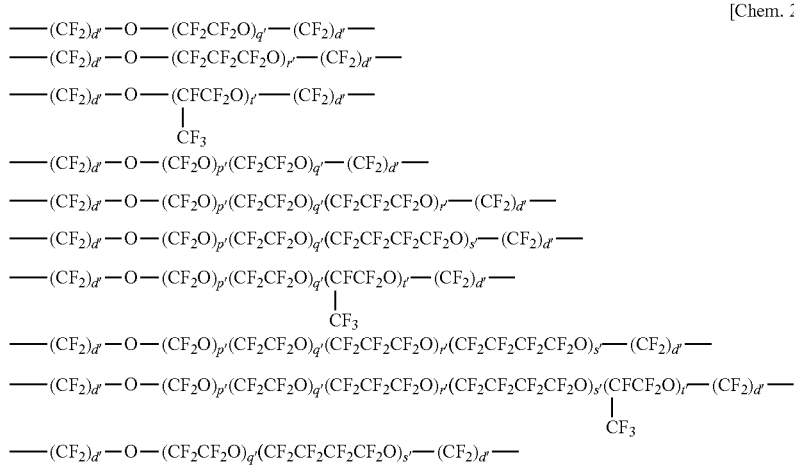

Herein p', q', r', s', and t' are each independently an integer of 1 to 200, the sum of p', q', r', s', and t' is 3 to 500, each unit in parentheses may be randomly arranged, d' is independently an integer of 0 to 5, and the unit with d' may be linear or branched.

More preferably, the fluorinated compound used herein is a hydrolyzable fluorinated organosilicon compound (or hydrolyzable fluorine-containing organosilicon compound) having any one of the general formulae (1) to (5). The compounds may be used alone or in admixture.

(A-Rf)$_\alpha$—ZW$_\beta$     (1)

Rf—(ZW$_\beta$)$_2$     (2)

Z'—(Rf—ZW$_\beta$)$_\gamma$     (3)

A-Rf-Q-(Y)$_\delta$—B     (4)

Rf-(Q-(Y)$_\delta$—B)$_2$     (5)

In formulae (1) to (5), Rf is —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, p, q, r, s, and t are each independently an integer of 0 to 200, p+q+r+s+t is 3 to 500, each unit in parentheses may be randomly arranged, d is an integer of 0 to 8, the unit with d may be linear or branched. "A" is fluorine, hydrogen or a monovalent fluorinated group terminated with —CF$_3$, —CF$_2$H or —CH$_2$F group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group. The subscripts α and β are each independently an integer of 1 to 7, preferably α is an integer of 1 to 3, more preferably 1, β is an integer of 1 to 3, α+β is an integer of 2 to 8, preferably an integer of 2 to 4, and γ is an integer of 2 to 8, preferably 2 or 3.

Q is a single bond or divalent organic group, δ is independently an integer of 1 to 10, Y is a divalent organic group having a hydrolyzable group, and B is hydrogen, C$_{1-4}$ alkyl or halogen.

In formulae (1) to (5), Rf is the above-described (poly)fluorooxyalkylene structure: —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, examples of which are as illustrated above.

[Chem. 29]

In formulae (1) and (4), "A" is fluorine, hydrogen or a monovalent fluorinated group terminated with —CF$_3$, —CF$_2$H or —CH$_2$F group. Inter alia, —CF$_3$, —CF$_2$CF$_3$ and —CF$_2$CF$_2$CF$_3$ groups are preferred.

In formulae (1) to (3), Z and Z' are each independently a single bond, or a di- to octavalent organic group which may contain nitrogen, oxygen, silicon, phosphorus or sulfur and which may be fluorinated. The organic group may be represented by (L)$_e$-M wherein e is an integer of 1 to 7, preferably 1 to 3.

Herein L is a single bond, oxygen, sulfur or a divalent organic group. In formulae (1) to (3), L in Z is a linking group between Rf group and M group (or W group), and L in Z' is a linking group between M group (or Rf group) and Rf group. The divalent organic group is preferably an unsubstituted or substituted C$_{2-12}$ divalent organic group which may contain one or more selected from the group consisting of amide bond, ether bond, ester bond, diorganosilylene groups such as dimethylsilylene, and groups of the formula: —Si[OH][(CH$_2$)$_f$Si(CH$_3$)$_3$]— wherein f is an integer of 2 to 4, more preferably an unsubstituted or substituted C$_{2-12}$ divalent hydrocarbon group which may contain the foregoing structure.

Examples of the unsubstituted or substituted C$_{2-12}$ divalent hydrocarbon group include alkylene groups such as ethylene, propylene (trimethylene or methylethylene), butylene (tetramethylene or methylpropylene), hexamethylene, and octamethylene, arylene groups such as phenylene, and combinations of two or more such groups, such as alkylene-arylene groups. In these groups, some or all of carbon-bonded hydrogen atoms may be substituted by halogen atoms such as fluorine and iodine. Inter alia, unsubstituted or substituted $C_{2-4}$ alkylene groups or phenylene groups are preferred.

Examples of the divalent organic group L include groups of the following structure, and combinations of two or more such groups.

[Chem. 30]

—(CH$_2$)$_u$—O—(CH$_2$)$_v$—

[Chem. 31]

—(CH$_2$)$_f$—    —CH$_2$—CH—    —CF—
                          |           |
                          I           CF$_3$

—CH$_2$—CH—    —CH$_2$—C—    —(CH$_2$)$_g$—Si—C$_2$H$_4$—
       |              |                    |
       C$_f$H$_{2f+1}$  C$_f$H$_{2f+1}$         Me
                      |
                      I

OH
                                        |
—C(=O)—NH—(CH$_2$)$_f$—    —(CH$_2$)$_g$—Si—
                                        |
                                        (CH$_2$)$_f$Si(Me)$_3$

—C(=O)—N(Me)—(CH$_2$)$_f$—

[Chem. 32]

—C(=O)—N(Ph)—(CH$_2$)$_f$—

—C(=O)—N(Ph)—(CH$_2$)$_f$—Si(Me)$_2$—C$_2$H$_4$—

—C(=O)—N(Ph)—(CH$_2$)$_f$—Si(Me)$_2$—    —C(=O)—O—(CH$_2$)$_f$—

—C(=O)—N(Me)—C$_6$H$_4$—Si(Me)$_2$—CH$_2$CH$_2$—

[Chem. 33]

—Si(Me)$_2$—(CH$_2$)$_b$—Si(Me)$_2$—    —Si(Me)$_2$—C$_6$H$_4$—Si(Me)$_2$—

Herein f is an integer of 2 to 4, b is an integer of 2 to 6, preferably 2 to 4, u and v each are an integer of 1 to 4, g is an integer of 2 to 4, and Me is methyl.

Also, M is a single bond, nitrogen, silicon, carbon, phosphorus or a group containing such atom, or a di- to octavalent organic group. Specifically, M is a single bond, divalent group —R$^1$$_2$C—, divalent group —R$^3$$_2$Si—, divalent group —NR$^4$—, trivalent group —N=, trivalent group —P=, trivalent group —PO=, trivalent group —R$^1$C=, trivalent group —R$^3$Si=, tetravalent group —C=, tetravalent group —O—C=, tetravalent group —Si=, or di- to octavalent siloxane residues. In formulae (1) to (3), M in Z is a linking group between L (or Rf group) and W group, and M in Z' is a group to link with Rf group via L.

Herein, R$^1$ is each independently a $C_{1-3}$ alkyl group, hydroxyl group, group having repeating unit of $C_{1-3}$ oxyalkylene group which may have an intervening diorganosiloxane structure of 2 to 51 silicon atoms, or silyl ether group represented by R$^2$$_3$SiO—. R$^2$ is each independently hydrogen, a $C_{1-3}$ alkyl group, aryl group such as phenyl, or $C_{1-3}$ alkoxy group. R$^3$ is each independently a $C_{1-3}$ alkyl group, $C_2$ or $C_3$ alkenyl group, $C_{1-3}$ alkoxy group, or chloro. R$^4$ is a $C_{1-3}$ alkyl group or $C_{6-10}$ aryl group such as phenyl. When M is a siloxane residue, it preferably has a straight, branched or cyclic organopolysiloxane structure of 2 to 51 silicon atoms, preferably 2 to 13 silicon atoms, more preferably 2 to 11 silicon atoms, even more preferably 2 to 5 silicon atoms. The organopolysiloxane having an unsubstituted or fluorinated alkyl group of 1 to 8 carbon atoms, more preferably 1 to 4 carbon atoms such as methyl, ethyl, propyl, butyl or $C_3F_7$—$C_3H_6$—, or phenyl group is preferred. The organopolysiloxane may also contain a silalkylene structure in which two silicon atoms are linked by an alkylene group, that is, Si—(CH$_2$)$_n$—Si wherein n is an integer of 2 to 6, preferably an integer of 2 to 4.

The following are exemplary of M defined above.

[Chem. 34]

—Si(Me)—    —C(OH)—    —Si—    —C—
   |           |
   Me          H
   |           |
Me—Si—Me    Me—Si—OMe                CH$_2$
   |           |              Cl    ‖
   O           O              |     CH
   |           |              Si—   |
   C—          C—             |     H$_2$C—Si—
   |           |                    |

[Chem. 35]

O—              O—(CH$_2$CH$_2$O)$_i$—CH$_3$
     |               |
—C—             —C—
     |               |

-continued

[Chem. 36]
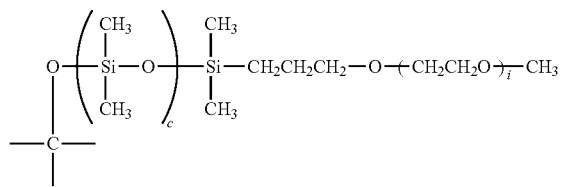

[Chem. 37]
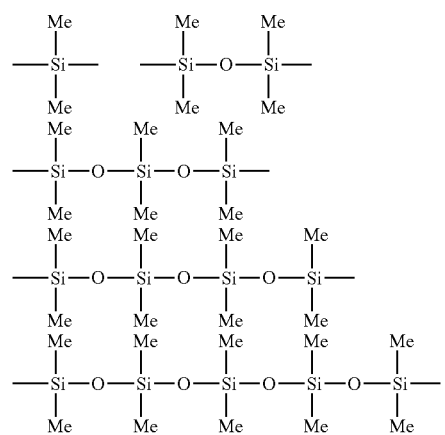

[Chem. 38]
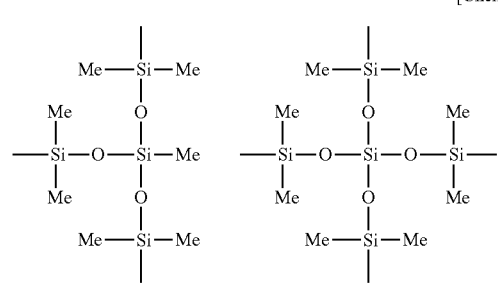

[Chem. 39]
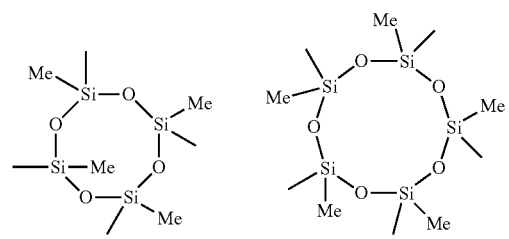

[Chem. 40]
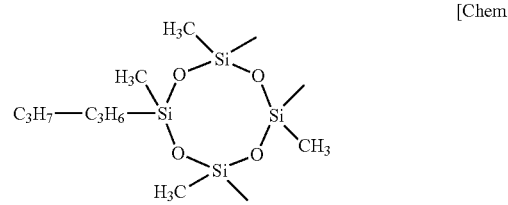

Herein i is an integer of 1 to 20, c is an integer of 1 to 50, and Me is methyl.

In formulae (1) to (3), W is a monovalent organic group terminated with a hydrolyzable group, preferably represented by the following formula.

[Chem. 41]
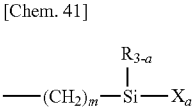

Herein R is $C_{1-4}$ alkyl or phenyl, X is a hydrolyzable group, a is 2 or 3, and m is an integer of 0 to 10.

In the above formula, examples of the hydrolyzable group X include alkoxy groups of 1 to 12 carbon atoms, especially 1 to 10 carbon atoms such as methoxy, ethoxy, propoxy and butoxy, alkoxyalkoxy groups of 2 to 12 carbon atoms, especially 2 to 10 carbon atoms such as methoxymethoxy and methoxyethoxy, acyloxy groups of 1 to 10 carbon atoms such as acetoxy, alkenyloxy groups of 2 to 10 carbon atoms such as isopropenoxy, halogen groups such as chloro, bromo and iodo, and amino groups. Inter alia, methoxy and ethoxy groups are preferred.

R is $C_{1-4}$ alkyl such as methyl or ethyl, or phenyl, with methyl being preferred.

The subscript "a" is 2 or 3. From the standpoints of reactivity and substrate adhesion, "a" is preferably equal to 3. The subscript m is an integer of 0 to 10, preferably an integer of 2 to 8, more preferably 2 or 3.

In formulae (1) to (3), examples of the structures represented by $(-)_\alpha Z W_\beta$ and $-Z W_\beta$ include the following structures

[Chem. 42]
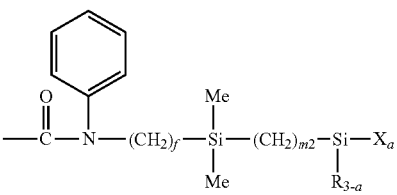

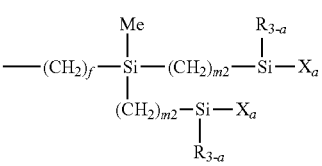

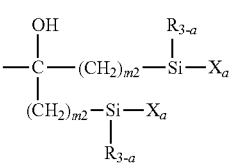

[Chem. 43]
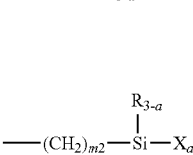

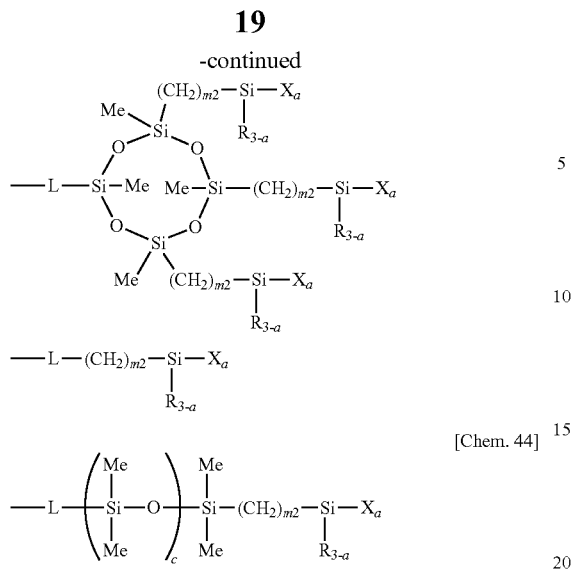

[Chem. 44]

Herein, L, R, X, f, c, and a are as defined above; m1 is an integer of 0 to 10, preferably an integer of 2 to 8, m2 is an integer of 1 to 10, preferably an integer of 2 to 8, and Me is methyl.

In formulae (4) and (5), Q is a single bond or divalent organic group, that is a linking group between Rf group and Y group. The divalent organic group represented by Q is preferably an unsubstituted or substituted $C_{2-12}$ divalent organic group which may contain at least one structure selected from amide bond, ether bond, ester bond, diorganosilylene groups such as dimethylsilylene, and groups represented by —Si[OH][(CH$_2$)$_f$Si(CH$_3$)$_3$]— wherein f is an integer of 2 to 4, more preferably an unsubstituted or substituted $C_{2-12}$ divalent hydrocarbon group which may contain the aforementioned structure.

Examples of the unsubstituted or substituted $C_{2-12}$ divalent hydrocarbon group are as exemplified above for the unsubstituted or substituted $C_{2-12}$ divalent hydrocarbon group L.

Examples of the divalent organic group Q include groups of the following structure.

[Chem. 45]

——(CH$_2$)$_u$——O——(CH$_2$)$_v$——

[Chem. 46]

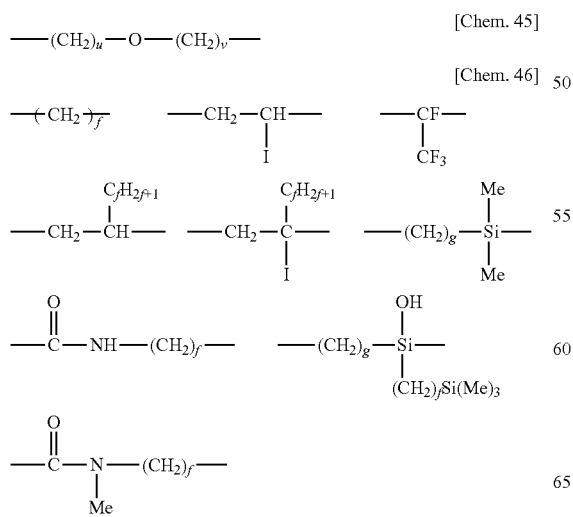

[Chem. 47]

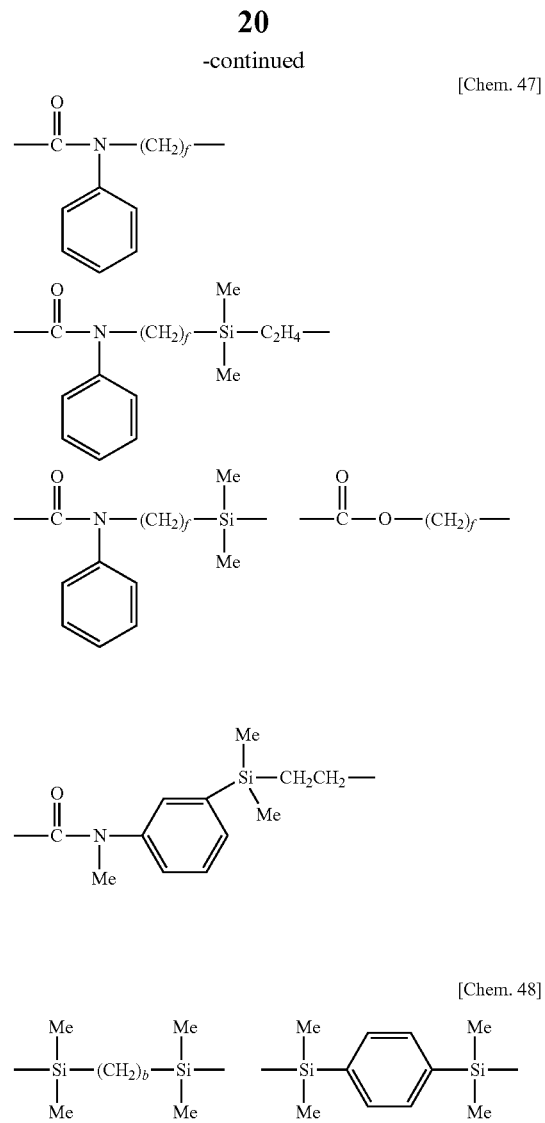

Herein f is an integer of 2 to 4, b is an integer of 2 to 6, preferably 2 to 4, u and v each are an integer of 1 to 4, g is an integer of 2 to 4, and Me is methyl.

In formulae (4) and (5), Y is each independently a divalent organic group having a hydrolyzable group, preferably a group of the following formula.

[Chem. 49]

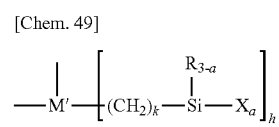

Herein R, X, and a are as defined above; k is an integer of 0 to 10, preferably an integer of 1 to 10, more preferably an integer of 2 to 8, even more preferably an integer of 2 to 6; h is an integer of 1 to 6, preferably 1 or 2. M' is an unsubstituted or substituted tri- to octavalent, preferably tri- or tetravalent hydrocarbon group, in which some or all of the carbon atoms may be replaced by silicon atoms and some or all of the carbon-bonded hydrogen atoms may be substituted by halogen atoms such as fluorine.

Preferably M' is selected from groups of the following structures.

[Chem. 50]

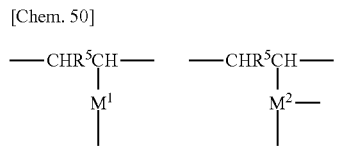

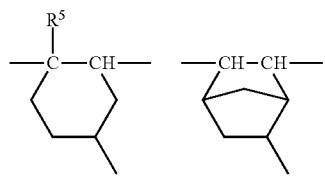

Herein $M^1$ is a single bond, unsubstituted or substituted $C_{1-6}$ divalent hydrocarbon group, or diorganosilylene group such as dimethylsilylene. $M^2$ is a trivalent group of the formula: $-R^1C\equiv$ or trivalent group of the formula: $-R^3Si\equiv$. $R^1$ and $R^3$ are as defined above. $R^5$ is hydrogen or a monovalent hydrocarbon group, typically $C_{1-6}$ alkyl group such as methyl, ethyl or propyl.

Exemplary of $M^1$ are a single bond, phenylene, dimethylsilylene and tetrafluoroethylene. The following is typical of $M^2$.

[Chem. 51]

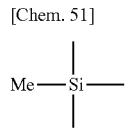

Herein Me is methyl.
For example, Y is selected from the following groups.

[Chem. 52]

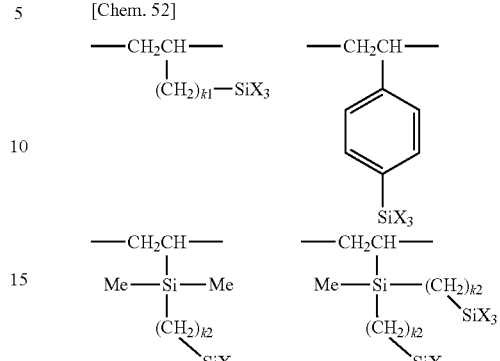

[Chem. 53]

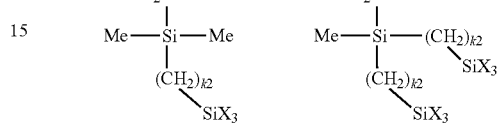

Herein X is as defined above, k1 is an integer of 0 to 10, preferably an integer of 1 to 8, k2 is an integer of 2 to 10, preferably an integer of 2 to 8, and Me is methyl.

In formulae (4) and (5), δ is an integer of 1 to 10, preferably an integer of 1 to 4.

B is each independently selected from hydrogen, $C_{1-4}$ alkyl groups such as methyl, ethyl, propyl and butyl, and halogen atoms such as fluorine, chlorine, bromine and iodine.

Examples of the hydrolyzable fluorinated organosilicon compounds (hydrolyzable fluorine-containing organosilicon compounds) having formulae (1) to (5) include the structures shown below.

[Chem. 54]

[Chem. 55]

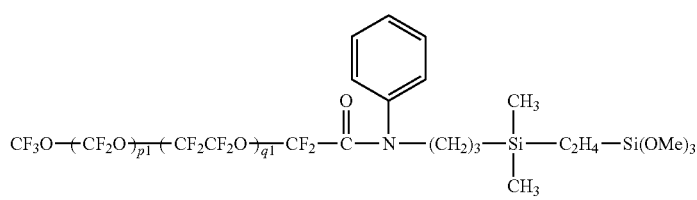

[Chem. 56]

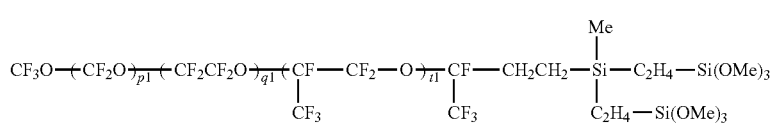

-continued
[Chem. 57]
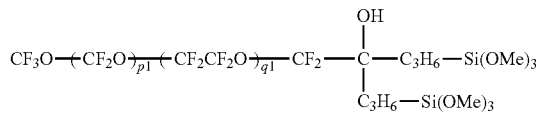
[Chem. 58]
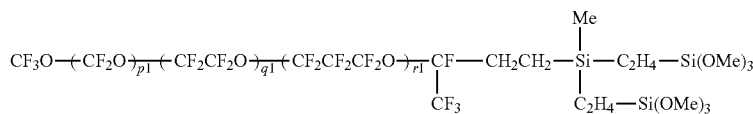
[Chem. 59]
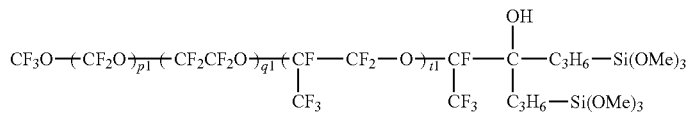
[Chem. 60]
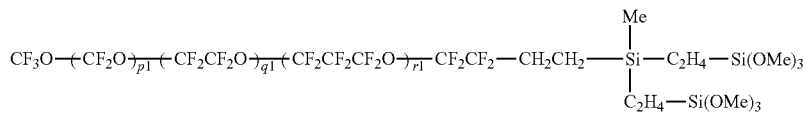
[Chem. 61]
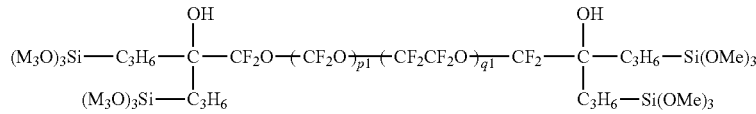
[Chem. 62]
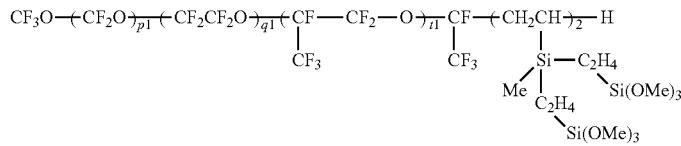
[Chem. 63]
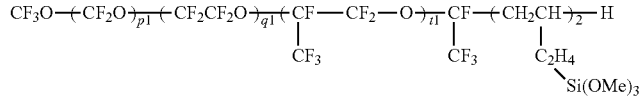
[Chem. 64]
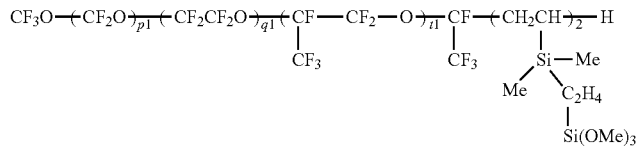
[Chem. 65]
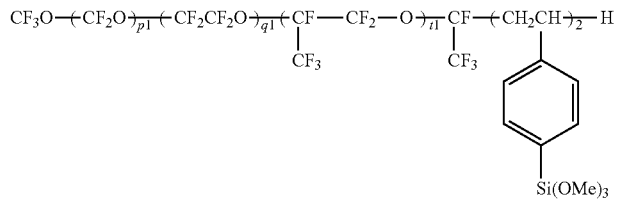
[Chem. 66]
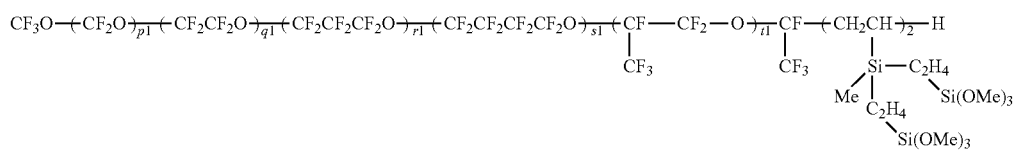
[Chem. 67]
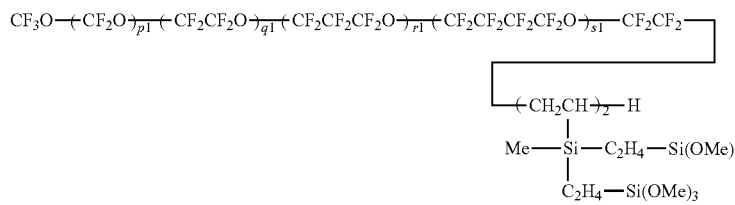

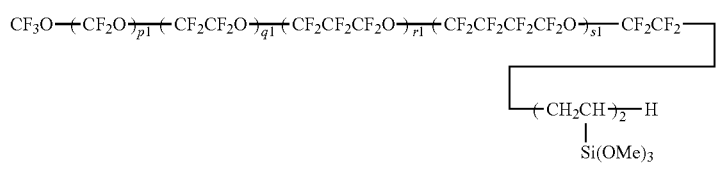
[Chem. 68]
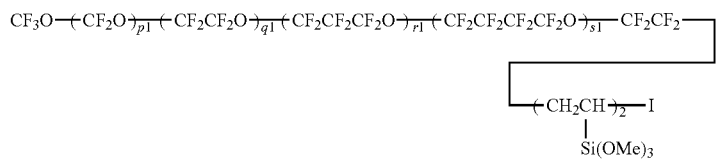
[Chem. 69]
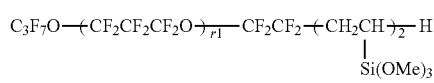
[Chem. 70]
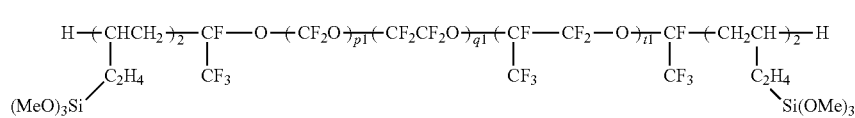
[Chem. 71]
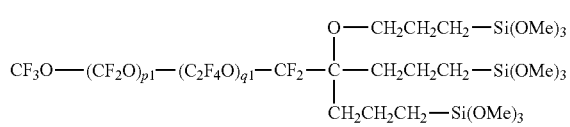
[Chem. 72]
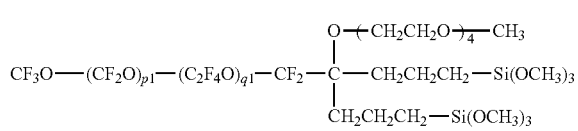
[Chem. 73]
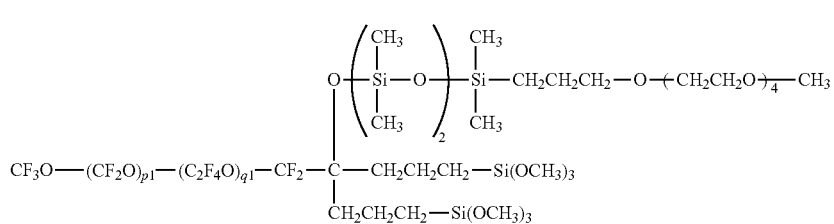
[Chem. 74]
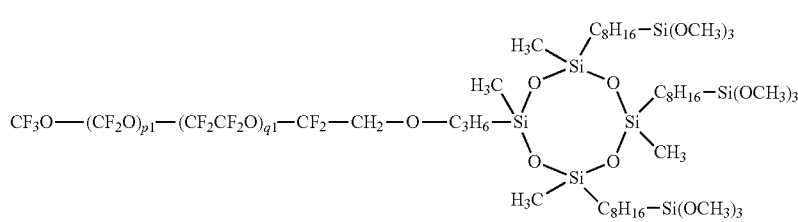
[Chem. 75]
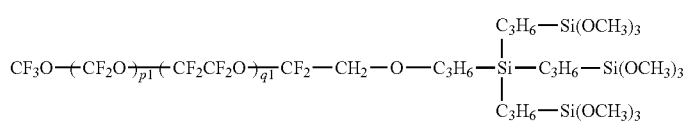
[Chem. 76]
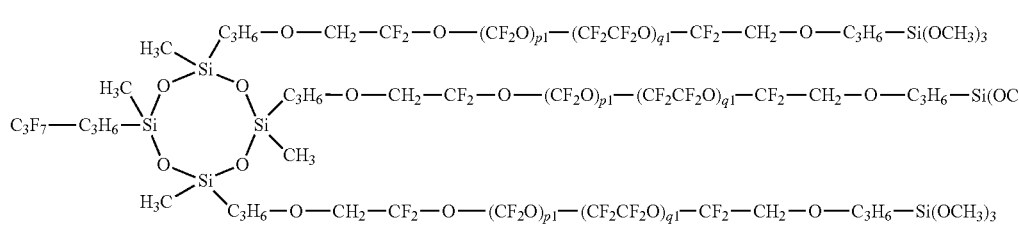
[Chem. 77]

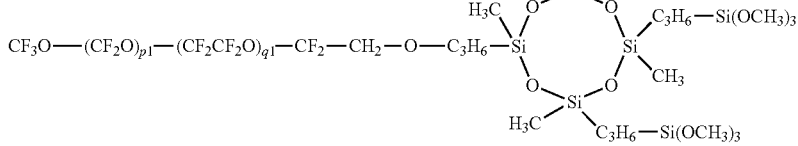

[Chem. 78]

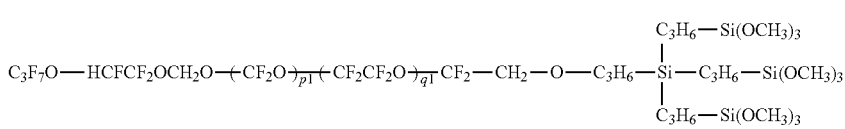

[Chem. 79]

Herein Me is methyl, p1, q1, r1, s1, and t1 are each independently an integer of 1 to 200, the sum of p1, q1, r1, s1, and t1 is 3 to 500, each unit in parentheses may be randomly arranged.

The hydrolyzable fluorinated organosilicon compound (hydrolyzable fluorine-containing organosilicon compound) having any of formulae (1) to (5) may contain such compounds in which some or all of the hydrolyzable groups (X) are hydrolyzed, that is, X is OH group and may further contain such compounds in which some or all of the OH groups are condensed.

Desirably the fluorinated compound is previously diluted with a solvent. The solvent used herein is not particularly limited as long as the fluorinated compound is uniformly dissolved. Examples include fluorine-modified aliphatic hydrocarbon solvents (e.g., perfluoroheptane and perfluorooctane), fluorine-modified aromatic hydrocarbon solvents (e.g., 1,3-trifluoromethylbenzene), fluorine-modified ether solvents (e.g., methyl perfluorobutyl ether, ethyl perfluorobutyl ether, perfluoro(2-butyltetrahydrofuran)), fluorine-modified alkylamine solvents (e.g., perfluorotributylamine, perfluorotripentylamine), hydrocarbon solvents (e.g., petroleum benzine, toluene, xylene), and ketone solvents (e.g., acetone, methyl ethyl ketone, methyl isobutyl ketone). Of these, fluorine-modified solvents are desirable for solubility and stability, and fluorine-modified ether solvents and fluorine-modified aromatic hydrocarbon solvents are especially preferred.

The foregoing solvents may be used alone or in admixture.

The solvent is preferably used in such amounts that the concentration of the fluorinated compound may fall in a range of 0.01 to 50% by weight, more preferably 0.03 to 10% by weight, even more preferably 0.05 to 1% by weight of the water/oil repellent agent (solution of the fluorinated compound in the solvent).

The water/oil repellent agent containing the fluorinated compound may be applied to substrates by any well-known processes such as wet coating processes (e.g., dipping, brush coating, spin coating, spraying, gravure coating, die coating, bar coating, and slit coating) and evaporation. Although coating and other conditions may accord with the prior art well-known process, it is efficient that the water/oil repellent agent containing the fluorinated compound is deposited by the wet coating process because the primer layer is deposited by the wet coating process.

The fluorinated compound may be cured at room temperature (25° C.) for 1 to 24 hours. Cure may be completed within a shorter time by heating at 30 to 200° C. for 1 minute to 1 hour. Cure under humid conditions (RH 50 to 90%) is preferred for accelerating hydrolysis.

It is noted that the surface of the primer layer on the substrate may be cleaned or activated by plasma treatment, UV treatment or ozone treatment before the water/oil repellent agent containing the fluorinated compound is coated thereon.

The fluorinated layer (water/oil repellent layer) of the inventive water/oil repellent member has a thickness of 0.5 to 30 nm, preferably 1 to 20 nm. If the layer is too thick, the treating agent may agglomerate together, exacerbating visibility. If the layer is too thin, surface properties and abrasion resistance may be insufficient.

Examples of the inventive water/oil repellent member thus obtained include housings of car navigation systems, PC tablets, smartphones, digital cameras, digital video cameras, PDAs, portable audio players, car audio players, and video game consoles; optical articles such as lenses (e.g., camera lenses, eyeglass lenses, sunglasses, AR lenses, and VR lenses), medical instruments (e.g., gastroscopes, surgical knives, blood pressure gauges, X-ray CT, and MRI), liquid crystal displays, organic EL displays, flexible devices, touch panel displays, protective films, antireflective films, compact disks, DVDs, and Blu-ray disks; sanitary wares such as bathtubs and washbowls; kitchen wares such as kitchen counters; windowpanes and headlamp covers of automobiles, trains and aircraft; building exterior members; kitchen building members; waiting rooms; art works; bodies, aluminum wheels and mirrors of transportation vehicles; and extremely high frequency (EHF) sensor covers.

EXAMPLES

Examples and Comparative Examples are shown below for further illustrating the invention although the invention is not limited thereby.

Example 1 and Comparative Examples 1 to 5

Formation of Primer Layer

Primer layers 1 to 5 were formed on acrylic resin substrates (Engineering Test Service Co., Ltd., Acrylic Delaglas A, specimen substrate of 2 mm thickness, 50 mm width, 100 mm length) by the following methods.

Formation of Primer Layer 1

By dip coating the substrate with a treating liquid of the hydrolytic dehydrated condensate of tetraethoxysilane (Mw 25,000, silanol content 0.01 mol/g) diluted with butanol in a concentration of 0.5 wt % as solids and drying the coating at room temperature (25° C.) for 1 hour, Primer layer 1 of 20 nm thickness was formed on the substrate. The dip coating step included dipping the substrate in the treating liquid for 30 seconds and pulling up at 150 mm/min.

Formation of Primer Layer 2

By dip coating the substrate with a treating liquid of tetraethoxysilane diluted with ethanol in a concentration of 0.5 wt % as solids and curing the coating at 80° C. and 80% RH for 24 hours, Primer layer 2 of 20 nm thickness was formed on the substrate. The dip coating included dipping the substrate in the treating liquid for 30 seconds and pulling up at 150 mm/min.

Formation of Primer Layer 3

By dip coating the substrate with a treating liquid of a pentamer of tetraethoxysilane diluted with butanol in a concentration of 0.5 wt % as solids and curing the coating at 80° C. and 80% RH for 24 hours, Primer layer 3 of 18 nm thickness was formed on the substrate. The dip coating included dipping the substrate in the treating liquid for 30 seconds and pulling up at 150 mm/min.

Formation of Primer Layer 4

By dip coating the substrate with a treating liquid of perhydropolysilazane diluted with dibutyl ether in a concentration of 0.5 wt % as solids and curing the coating at 80° C. and 80% RH for 24 hours, Primer layer 4 of 23 nm thickness was formed on the substrate. The dip coating included dipping the substrate in the treating liquid for 30 seconds and pulling up at 150 mm/min.

Formation of Primer Layer 5

By sputter depositing a $SiO_2$ layer on the substrate, Primer layer 5 of 20 nm thickness was formed on the substrate.

Further, a water/oil repellent layer was formed on each of the substrates having Primer layers 1 to 5 formed thereon, by the following method.

Formation of Water/Oil Repellent Layer

Compound 1 shown below was diluted with a fluorochemical solvent (Novec 7200 by 3M) in a concentration of 0.1 wt % as solids. Using a spray coater (NST-51 by T&K Co., Ltd.), the dilution was sprayed onto the primer layer on the substrate. The coating was cured at 80° C. for 30 minutes to form a cured film (or water/oil repellent layer), yielding a specimen. The water/oil repellent layer had an average thickness of about 10 nm as computed from the F content detected by an X-ray fluorescence analyzer (ZSXmini2 by Rigaku Corp.).

[Chem. 80]

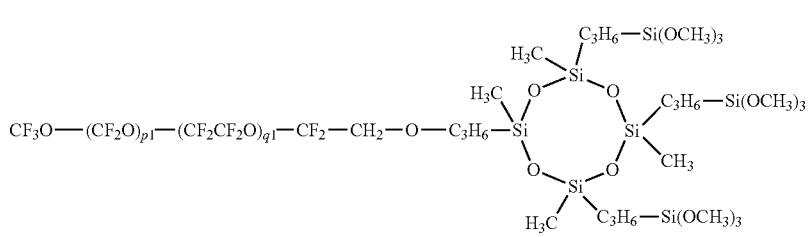

[Compound 1]

Herein $p1+q1=45$.

Example 1 was the substrate having Primer layer 1 formed thereon. Comparative Examples 1, 2, 3 and 4 were the substrates having Primer layers 2, 3, 4, and 5 formed thereon, respectively. In Comparative Example 5, a water/oil repellent layer was formed directly on an acrylic resin substrate by the above method without forming a primer layer. Using the specimens, various properties were evaluated by the following methods. The results are shown in Table 1.

Water and Oil Repellency

Using a contact angle meter (DropMaster by Kyowa Interface Science Co., Ltd.), the contact angles of the cured film (water/oil repellent layer) with water and oleic acid were measured.

Coefficient of Dynamic Friction

Using a surface property tester (Shinto Scientific Co., Ltd.), the cured film (water/oil repellent layer) was measured for a coefficient of dynamic friction with respect to fabric Bemcot (Asahi Kasei Corp.) under the following conditions.
contact area: 10 mm×30 mm
load: 100 g Sebum Stain Wipe-Off Seven panelists transferred sebum on their forehead to the surface of the cured film (water/oil repellent layer) with the finger, wiped the film surface with fabric Bemcot (Asahi Kasei Corp.), and evaluated wipe-off according to the following criteria.
A: complete wipe-off within 2 strokes
B: complete wipe-off within 3 to 5 strokes
C: some residues after 5 stroke wipe-off
D: little wipe-off after 5 strokes Abrasion Resistance Test Using a both-way wear tester (Heidon 30S, Shinto Scientific Co., Ltd.), an abrasion resistance test was carried out on the cured film (or water/oil repellent layer) under the following conditions. The cured film (or water/oil repellent layer) after the abrasion resistance test was measured for a contact angle with water using a contact angle meter (DropMaster by Kyowa Interface Science Co., Ltd.).
  environmental conditions: 25° C., humidity 40%
  rubbing member: tip portion (10 mm×10 mm) of the tester to come in contact with the specimen was wrapped with 8 stacked non-woven fabric sheets, which was secured by rubber band.
  load: 1 kg
  rubbing distance (one way): 30 mm
  rubbing speed: 3,600 mm/min
  reciprocation: 5,000 cycles

TABLE 1

|  | | Water/oil repellency | | | | Abrasion resistance test |
| --- | --- | --- | --- | --- | --- | --- |
|  | Primer layer | Water contact angle (°) | Oleic acid contact angle (°) | Coefficient of dynamic friction | Sebum stain wipe-off | Water contact angle (°) |
| Example 1 | 1 | 115 | 73 | 0.03 | A | 110 |
| Comparative Example 1 | 2 | 103 | 64 | 0.15 | D | — |
| Comparative Example 2 | 3 | 104 | 65 | 0.13 | C | — |
| Comparative Example 3 | 4 | 112 | 71 | 0.04 | A | 85 |
| Comparative Example 4 | 5 | 115 | 73 | 0.04 | A | 97 |
| Comparative Example 5 | none | 110 | 67 | 0.10 | D | — |

The symbol "—" in Table means that the substrate was so damaged that an exact contact angle with water could not be determined.

As is evident from the results in Table 1, Example 1 exhibited effective sebum stain wipe-off because of excellent water/oil repellency and a low coefficient of dynamic friction. It exhibited excellent water/oil repellency as demonstrated by a contact angle with water of more than 100° before and after the abrasion test. In Comparative Examples 1 and 2 using organosilicon compounds which had undergone no hydrolysis or were free of silanol groups, initial properties were unsatisfactory and abrasion resistance was poor. In Comparative Example 3 using perhydropolysilazane which was typical in the wet coating of a silica film, initial properties were excellent, but abrasion resistance was insufficient. In Comparative Example 4 using a sputtered $SiO_2$ film which was typical in the dry coating of a silica film, initial properties were excellent, but abrasion resistance was unsatisfactory. Comparative Example 5 using no primer failed to exhibit satisfactory performance. Since silanol groups are adhesive to substrates and reactive with fluorinated compounds having hydrolyzable groups, an antifouling film having excellent abrasion resistance can be formed.

INDUSTRIAL APPLICABILITY

According to the invention, a water/oil repellent member having a cured film (water/oil repellent layer) with excellent water/oil repellent properties is formed by only wet coating and room temperature process. Although the need for heat curing and vacuum process is eliminated, abrasion resistance surpassing the prior art level is available. The technology of the invention enables large area coating. Thus the water/oil repellent member of the invention enables production of functional film in roll form. Even when the invention is applied to articles which are of daily use and frequent touch, for example, electronic instrument housings and kitchen wares, a satisfactory antifouling surface is maintained over a long period of time.

The invention claimed is:

1. A water/oil repellent member comprising a substrate, a primer layer deposited on at least one surface of the substrate as a first layer, and a water/oil repellent layer deposited thereon as a second layer,
   the primer layer derived from an organosilicon compound having a plurality of silanol groups, which is a hydrolytic dehydrated condensate of tetraethoxysilane having a weight average molecular weight (Mw) of 5,000 to 100,000, a silanol content of 0.005 to 0.05 mol/g, and having a thickness of 0.5 to 500 nm,
   the water/oil repellent layer being composed mainly of a cured product of a fluorinated compound and having a thickness of 0.5 to 30 nm.

2. The water/oil repellent member of claim 1 wherein the fluorinated compound has at least one hydrolyzable group at one or more ends, the hydrolyzable group being selected from among $C_{1-12}$ alkoxy groups, $C_{1-12}$ alkoxyalkoxy groups, $C_{1-10}$ acyloxy groups, $C_{2-10}$ alkenyloxy groups, halogen, amino, and silazane groups.

3. The water/oil repellent member of claim 1 wherein the fluorinated compound is a fluorooxyalkylene group-containing organosilicon compound having in the molecule

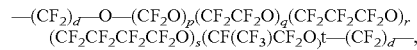

wherein p, q, r, s, and t are each independently an integer of 0 to 200, p+q+r+s+t is 3 to 500, each unit in parentheses may be randomly arranged, d is an integer of 0 to 8, the unit with d may be linear or branched, and having at least one hydrolyzable group at one or more ends.

4. The water/oil repellent member of claim 1 wherein the fluorinated compound is at least one compound selected from hydrolyzable fluorinated organosilicon compounds having the general formulae (1), (2), (3), (4), and (5):

$(A\text{-}Rf)_\alpha\text{—}ZW_\beta$      (1)

$Rf\text{—}(ZW_\beta)_2$      (2)

Z'—(Rf—ZW$_\beta$)$_\gamma$  (3)

wherein Rf is

—(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—CF$_2$)$_d$—, p, q, r, s, and t are each independently an integer of 0 to 200, p+q+r+s+t is 3 to 500, each unit in parentheses may be randomly arranged, d is an integer of 0 to 8, the unit with d may be linear or branched, A is fluorine, hydrogen or a monovalent fluorinated group terminated with —CF$_3$, —CF$_2$H or —CH$_2$F group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group, α and β are each independently an integer of 1 to 7, α+β is 2 to 8, and γ is an integer of 2 to 8, A-Rf-Q-(Y)$_\delta$—B  (4)

Rf-(Q-(Y)$_\delta$—B)$_2$  (5)

wherein Rf and A are as defined above, Q is a single bond or divalent organic group, δ is an integer of 1 to 10, Y is a divalent organic group having a hydrolyzable group, and B is hydrogen, C$_{1-4}$ alkyl or halogen.

5. The water/oil repellent member of claim 4 wherein the hydrolyzable fluorinated organosilicon compounds having formulae (1) to (5) are the following:

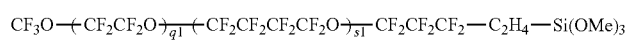
[Chem. 1]

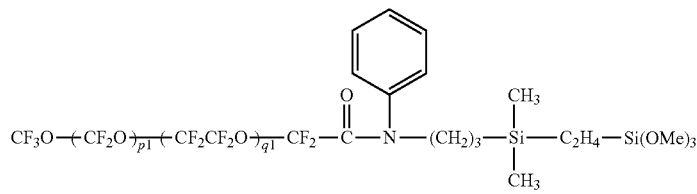
[Chem. 2]

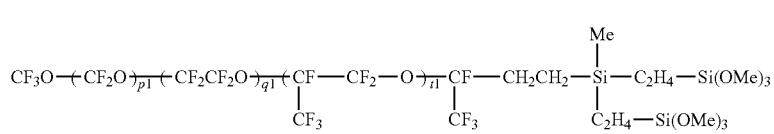
[Chem. 3]

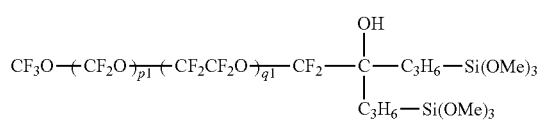
[Chem. 4]

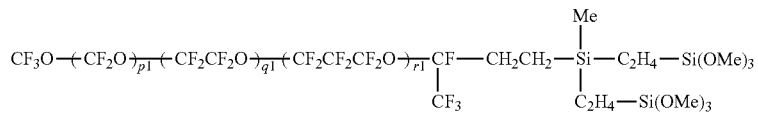
[Chem. 5]

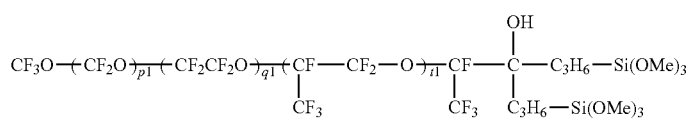
[Chem. 6]

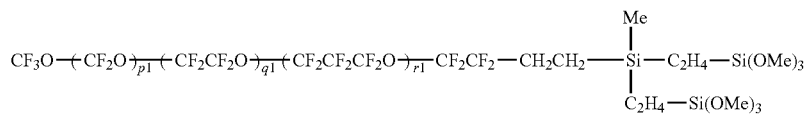
[Chem. 7]

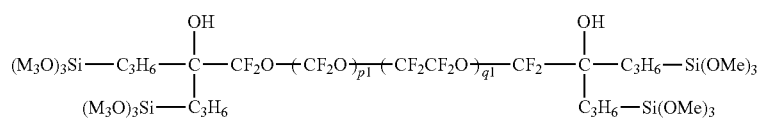
[Chem. 8]

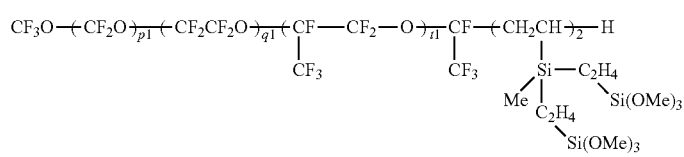
[Chem. 9]

-continued
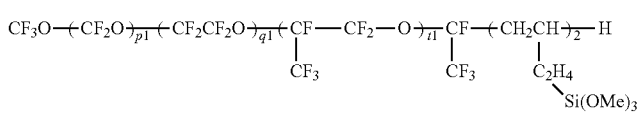
[Chem. 10]
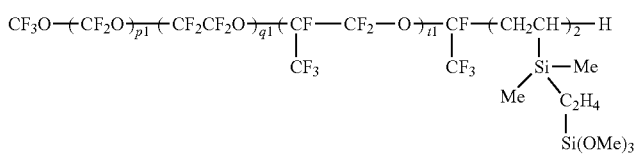
[Chem. 11]
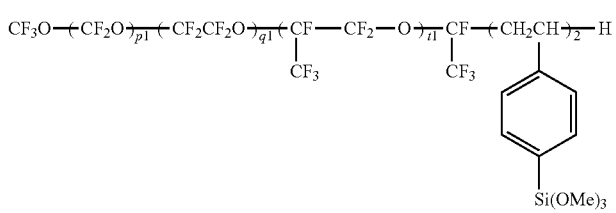
[Chem. 12]
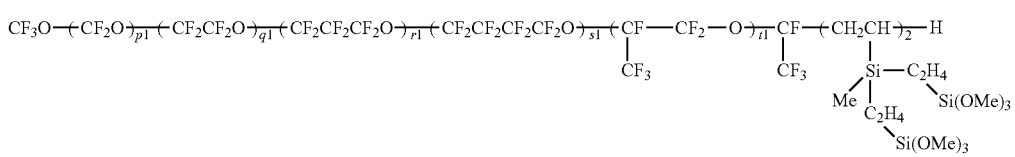
[Chem. 13]
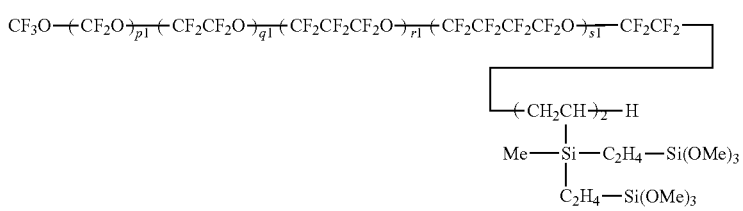
[Chem. 14]
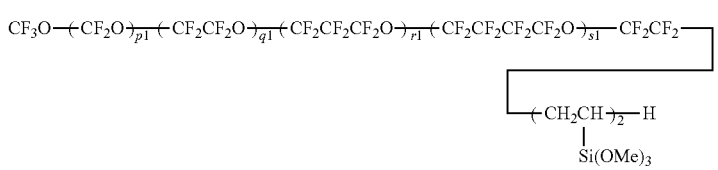
[Chem. 15]
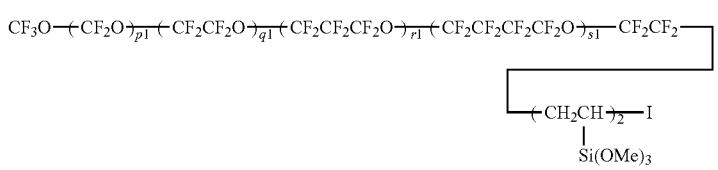
[Chem. 16]
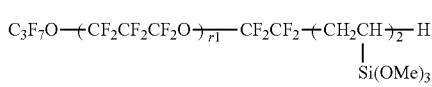
[Chem. 17]
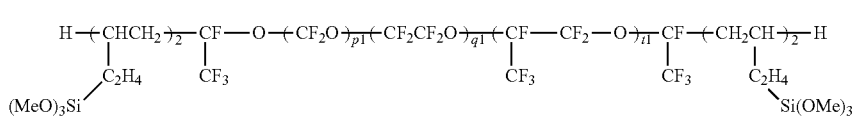
[Chem. 18]
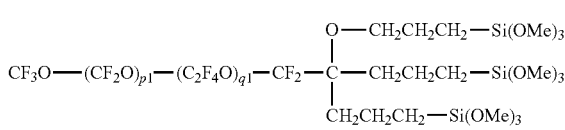
[Chem. 19]
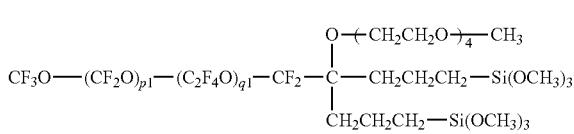
[Chem. 20]

-continued

[Chem. 21]
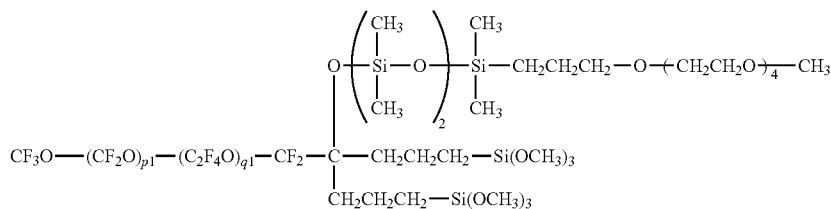

[Chem. 22]
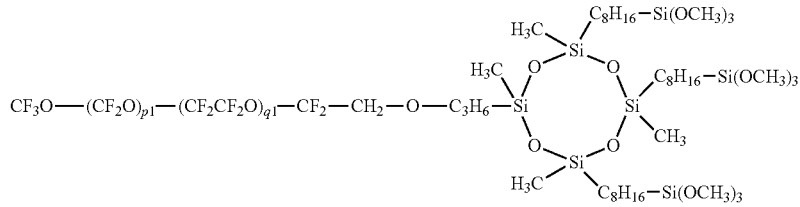

[Chem. 23]
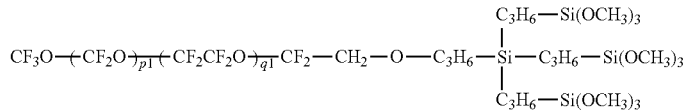

[Chem. 24]
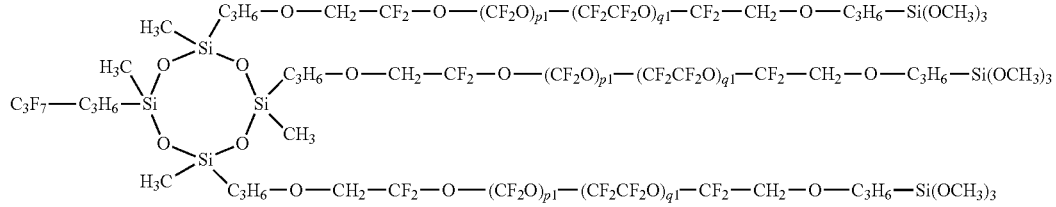

[Chem. 25]
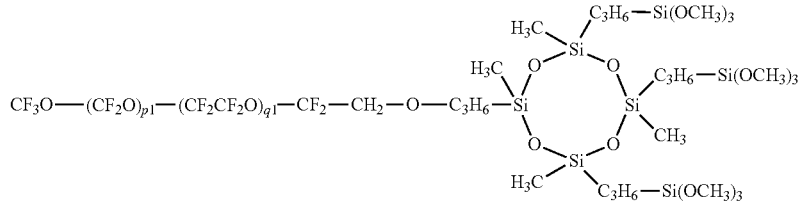

[Chem. 26]
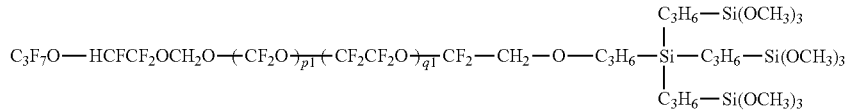

wherein Me is methyl, p1, q1, r1, s1, and t1 are each independently an integer of 1 to 200, the sum of p1, q1, r1, s1, and t1 is 3 to 500, each unit in parentheses may be randomly arranged.

6. The water/oil repellent member of claim 1 wherein the substrate is of a metal oxide, metal, resin, ceramic, quartz, glass, sapphire, or diamond.

7. A method for preparing the water/oil repellent member of claim 1, the method comprising the steps of:
wet coating a solution of an organosilicon compound having a plurality of silanol groups, which is a hydrolytic dehydrated condensate of tetraethoxysilane having a weight average molecular weight (Mw) of 5,000 to 100,000, a silanol content of 0.005 to 0.05 mol/g, in a solvent onto a surface of a substrate,
drying the solvent to form a primer layer,
wet coating a solution of a fluorinated compound in a solvent onto the primer layer and then drying the solvent, or providing a solution of a fluorinated compound in a solvent, evaporating off the solvent, and dry coating the fluorinated compound onto the primer layer, and
curing the fluorinated compound to form a water/oil repellent layer.

* * * * *